A. J. LOEPSINGER.
TEST PLUG.
APPLICATION FILED AUG. 26, 1916.

1,250,603.

Patented Dec. 18, 1917.

INVENTOR=
Albert J. Loepsinger,
By E. D. Chadwick,
Attorney.

UNITED STATES PATENT OFFICE.

ALBERT J. LOEPSINGER, OF EDGEWOOD, RHODE ISLAND, ASSIGNOR TO GENERAL FIRE EXTINGUISHER COMPANY, OF PROVIDENCE, RHODE ISLAND, A CORPORATION OF NEW YORK.

TEST-PLUG.

1,250,603.  Specification of Letters Patent.  Patented Dec. 18, 1917.

Application filed August 26, 1916. Serial No. 116,963.

*To all whom it may concern:*

Be it known that I, ALBERT J. LOEPSINGER, a citizen of the United States, residing at Edgewood, in the county of Providence and State of Rhode Island, have invented certain new and useful Improvements in Test-Plugs, of which the following is a specification.

After an automatic sprinkler system has been installed and before it is connected to the water supply it is the practice to subject it to a testing pressure considerably in excess of the intended service pressure in order to determine whether any leaks exist, and this is usually done by temporarily closing the end of the underground supply conduit, at the point where it is to be connected to the water supply, by means of a so-called "test plug," through which the system is pumped full of water and subjected to the desired testing pressure. The present invention relates to test plugs of this character, and is intended to provide a simple and practical plug construction which can be readily attached to and detached from the open end of the pipe system to be tested, will afford a tight closure therefor, and will be secure against detachment by the testing pressure employed.

The underground supply conduit for an automatic sprinkler system is commonly composed of sections of cast iron pipe having their adjacent ends telescoped and provided with the usual form of calked joint, consisting of yarn and lead packing, with the enlarged end of such a pipe section constituting the entrance to the system. The embodiment of my invention hereinafter described is particularly designed for use in connection with piping of the character just referred to, and is illustrated in its preferred form in the accompanying drawing, in which—

Figure 1:
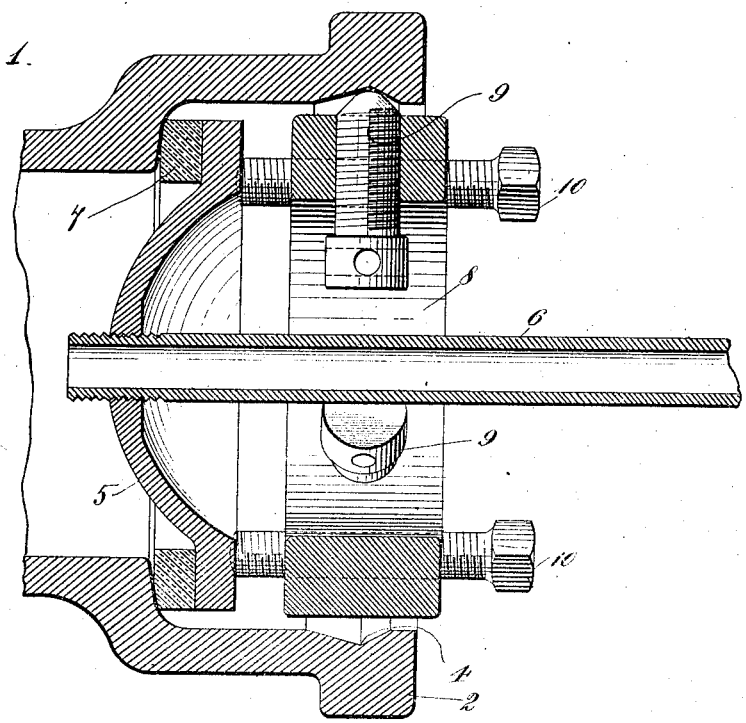
Figure 2:
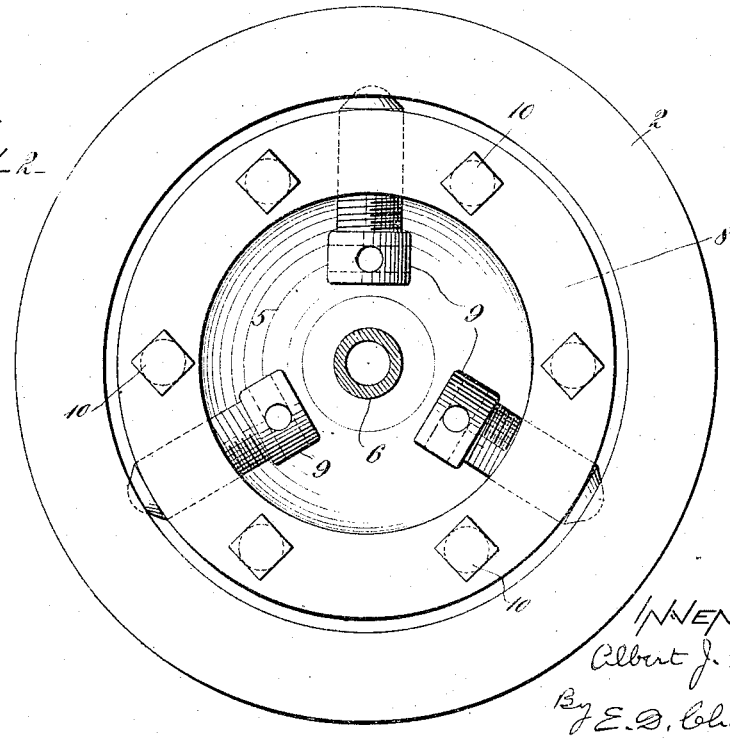

Figure 1 is a central longitudinal section through the enlarged end of a length of pipe, with my test plug applied thereto; and Fig. 2 is an elevation of the same parts, looking toward the open end of the pipe.

In the drawing, 2 indicates a portion of an underground pipe section, the enlarged outer end or "bell" of which may be assumed to constitute the entrance to a sprinkler pipe system, 3 indicates the angular shoulder formed within the pipe at the point where its enlarged portion terminates, and 4 indicates an internal annular groove which receives the lead packing and holds it in place. The shoulder 3 is utilized as the seat for the member employed for temporarily closing the pipe, which consists of a circular plate 5 of suitable diameter and having a threaded opening into which is screwed one end of a pipe 6 through which the water employed for testing the system is introduced and pumped up to the necessary pressure. A suitable gasket 7 is placed between the shoulder 3 and the plate 5 in order to secure a fluid-tight closure.

As described thus far the arrangement is similar to that heretofore employed, but instead of forcing the plate 5 against the gasket 7 by means of devices clamped to the exterior of the pipe section 2, as has been the practice heretofore, I employ for that purpose a ring 8 adapted to be inserted within the enlarged end of the pipe section 2 and carrying a number of threaded bolts 9 which pass transversely through the ring and can be screwed outward or inward from the interior of the latter, the outer ends of these bolts being located in the same plane and adapted to enter the groove 4. The ring 8 also carries a number of other threaded bolts 10 which pass through the ring between the bolts 9 in a direction at right angles to the length of the latter and are arranged to bear at their inner ends against the outer face of the plate 5 near its edge, which is shown as provided with a shallow groove to receive the ends of said bolts.

In using the parts above described, after the gasket 7 and the plate 5 have been placed in position in the pipe section 2 the ring 8 is inserted and firmly secured in place by screwing the bolts 9 outward, whereupon the bolts 10 are screwed forward until the plate 5 is held against the gasket under a pressure sufficient to provide a tight closure. The pipe 6 is then screwed into the plate 5, or this may be done before the plate is inserted, and then the pipe system is tested by pumping water into it through the pipe 6 in the usual way. The bolts are then unscrewed and the parts are removed, leaving the end of the pipe section 2 ready for connection to the supply system.

It is an important advantage of my test plug construction that the devices by means of which the plate 5 is held in position in the pipe section to which it is applied are located wholly within the latter, since it is often difficult and sometimes impossible to hold the pipe-closing member securely in position by clamping devices applied to the exterior of the pipe section. Other useful characteristics of the construction herein described reside in its simplicity and its freedom from liability to get out of order, but it will be understood that its details may be modified in various ways without departing from my invention.

I claim:

A test plug comprising a pipe-closing member and a ring adapted to be inserted into the open end of the pipe, said ring being provided with threaded bolts extending transversely through the ring from its interior and with other threaded bolts extending at right angles to the first-mentioned bolts and adapted to bear against the outer face of the pipe-closing member.

Signed at Boston, Massachusetts, this 23rd day of August, 1916.

ALBERT J. LOEPSINGER.

Copies of this patent may be obtained for five cents each, by addressing the "Commissioner of Patents, Washington, D. C."